United States Patent

[11] 3,576,541

[72] Inventors Kenneth C. Kwan
Hacienda Heights;
Jean A. DeBeule, Altadena, Calif.

[21] Appl. No. 694,897
[22] Filed Jan. 2, 1968
[45] Patented Apr. 27, 1971
[73] Assignee Burroughs Corporation
Detroit, Mich.

[54] METHOD AND APPARATUS FOR DETECTING AND DIAGNOSING COMPUTER ERROR CONDITIONS
39 Claims, 13 Drawing Figs.

[52] U.S. Cl. .......... 340/172.5
[51] Int. Cl. .......... G06f 11/04
[50] Field of Search .......... 340/172.5; 235/157

[56] References Cited

UNITED STATES PATENTS

| | | | |
|---|---|---|---|
| 3,226,684 | 12/1965 | Cox .......... | 340/172.5 |
| 3,237,100 | 2/1966 | Chalfin et al. .......... | 340/172.5X |
| 3,343,141 | 9/1967 | Hackl .......... | 340/172.5 |

OTHER REFERENCES

Downing et al., No. 1 ESS Maintenance Plan, Bell System Technical Journal, Sept. 1964, Vol. XLIII, No. 5, Part 1, Pages 1993— 1996.

*Primary Examiner*—Paul J. Henon
*Assistant Examiner*—Sydney Chirlin
*Attorney*—Christie, Parker and Hale

ABSTRACT: Method and apparatus for detecting and diagnosing error conditions in any of a plurality of discrete units within a digital computer system effected by execution of test routines each of which is adapted to detect and diagnose errors in a selected one of the units. Each test routine comprises a plurality of test strings which are serially executed. Each test string includes one or more test cases and the strings are sequenced within the routine such that strings containing larger numbers of cases are executed prior to those having fewer numbers of cases. Execution of each test case within a string is effected by setting the unit to be tested to a predetermined initial state, feeding a clock pulse to the unit, determining the resultant state of the unit, and comparing the resultant state with a predetermined expected state. Failure of any such comparison indicates failure of a test case and the detection of an error. Failure of all test cases within a single test string indicates that a particular diagnosable error condition associated with that string is the error source. Failure of the first test case within a string is utilized to set a binary error element while the success of any subsequent test case within the string will reset the element. In one embodiment, each test case is repeatedly executed a predetermined number of times in order to detect intermittent errors.

| | | | | | | |
|---|---|---|---|---|---|---|
| T1 | T2 | T4 | T8 | | | F1 |
| T1 | T2 | T4 | | | | F2 |
| T1 | T2 | T9 | | | | F3 |
| T1 | T2 | T14 | | | | F4 |
| T1 | T2 | | | | | F5 |
| T1 | T5 | | | | | F6 |
| T1 | T10 | | | | | F7 |
| T1 | T15 | | | | | F8 |
| T3 | T6 | | | | | F9 |
| T3 | T11 | | | | | F10 |
| T7 | T12 | | | | | F11 |
| T7 | T16 | | | | | F12 |
| T1 | | | | | | F13 |
| T3 | | | | | | F14 |
| T7 | | | | | | F15 |
| T13 | | | | | | F16 |

INVENTORS
KENNETH C. KWAN
JEAN A. DeBEULE
BY
Christie, Parker & Hale
ATTORNEYS

INVENTORS
KENNETH C. KWAN
JEAN A. DeBEULE
BY
Christie, Parker & Hale
ATTORNEYS

PATENTED APR 27 1971 3,576,541

SHEET 3 OF 6

INVENTORS.
KENNETH C. KWAN
JEAN A. DeBEULE
BY
Christie, Parker & Hale
ATTORNEYS.

INVENTORS.
KENNETH C. KWAN
JEAN A. DEBEULE
BY Christie, Parker & Hale
ATTORNEYS

INVENTORS.
KENNETH C. KWAN
JEAN A. DeBEULE
BY Christie, Parker & Hale
ATTORNEYS.

| TC#0 | | | ADDRESS |
|---|---|---|---|
| SCAN IN | 01000000 | 11110000 | 200 |
| TEST | 00000000 | 00000000 | 201 |
| SCAN OUT | 10000000 | 00000000 | 202 |
| COMPARE | 11000000 | 1111110 | 203 |
| SET ERROR | 11000001 | 00000100 | 204 |
| END | 11000110 | 00000000 | 205 |
| SET ADDRESS | 11100001 | 10011001 | 206 |

| TC#1 | | | ADDRESS |
|---|---|---|---|
| SCAN IN | 01000000 | 11101000 | 207 |
| TEST | 00000000 | 00000000 | 208 |
| SCAN OUT | 10000000 | 00000000 | 209 |
| COMPARE | 11000000 | 11101010 | 210 |
| RESET ERROR | 11000010 | 00000010 | 211 |
| END STRING | 11000111 | 00000000 | 212 |
| SET ADDRESS | 11100010 | 00000110 | 213 |

INVENTORS
KENNETH C. KWAN
JEAN A. DeBEULE
BY Christie, Parker & Hale
ATTORNEYS

METHOD AND APPARATUS FOR DETECTING AND DIAGNOSING COMPUTER ERROR CONDITIONS

BACKGROUND OF THE INVENTION

This invention relates to digital information handling systems and, more particularly, to method and apparatus for detecting error conditions in electronic computers and for automatically diagnosing the source of such error conditions down to the individual component level.

As computer systems have grown more complex, the need for detecting errors within such systems and for diagnosing the source of such errors has grown correspondingly in importance. The development of test programs has contributed greatly to the maintenance of such systems but such programs have fallen short of industry needs. Such prior art test programs have lacked the capability to point reliably to a source of failure. Instead, they merely registered the presence or absence of hardware failures or pointed to a large and often vaguely outlined area of the system. It was possible to determine that a particular unit under test wasn't working properly or that a particular command wasn't working, but it was not possible to diagnose which one of thousands of replaceable components was in need of replacement. Consequently, after detection of an error and a relatively vague diagnosis of its location, a considerable amount of manual testing was required in order to locate the component in need of replacement. As the reliability and complexity of computer systems have increased, the mean-time-to-repair has also increased. A major part of the mean-time-to-repair has been the time required for manual testing by maintenance men in order to pinpoint the defective component.

Prior art test programs have generally been arranged to execute a sequence of test cases in accordance with a "branching" technique. In such a program, the sequence in which the test cases are executed is determined by the results of the test cases. Thus, each test case result determines which particular test case will next be executed. Random accessing of the test cases is consequently necessitated and the test cases must be stored in a random access device such as a core memory or disc store. In relatively large data processing systems, several hundred thousand different test cases are required if a test program is to have sufficient diagnostic power to diagnose errors down to the replaceable component level. Such a large number of test cases would require that a large memory or disc be permanently reserved solely for the test program. Because of the expense involved in providing such a memory or disc, such an approach is not economically feasible. If on the other hand, magnetic tape were to be used for the storage of the test cases, with the tape being rewound, after each test case execution, to the location of a next test case determined by the result of the previous case, the amount of time required to complete the test program becomes very great and an excessive amount of "down time" results.

An advantage of the present invention is that it provides a system for detecting and diagnosing error conditions which is able to diagnose errors down to the replaceable component level.

Another advantage of the present invention is that it provides a system for detecting and diagnosing error conditions in a shorter period of time than do previous systems.

A further advantage of the present invention is that it provides a system of detecting and diagnosing error conditions which is more economical than previous systems.

Yet another advantage of the present invention is that it detects and diagnoses error conditions in a data processing system by means of the serial execution of test cases thereby eliminating the requirement of random accessing of such test cases.

Still another advantage of the present invention is that it provides an improved apparatus and method for detecting error conditions in digital data processing systems and for automatically diagnosing the source of such error conditions down to the replaceable component level.

SUMMARY OF THE INVENTION

In brief, the preceding and additional advantages are achieved in a system wherein test routine made up of a collection of test cases is executed. The test cases are grouped into test strings as described in detail hereinafter. Each test string is directed to the diagnosis of a particular error condition. Thus, all of the test cases which can each detect one and the same failure condition are grouped together and executed one after the other and comprise a single test string. While test cases are unique within a test string, they are not necessarily unique in the test routine. Consequently, a particular test case may appear in many separate test strings. As a further consequence, the sequence of test strings within a test routine is not arbitrary although the sequence of test cases within a test string is arbitrary. In the interest of reliable diagnosis, it is essential that longer test strings within a test routine be executed prior to the execution of shorter strings. This results since failure of every test case within a shorter string correctly diagnoses a particular error only if all longer strings which also include all of these cases, as well as additional cases, include at least one such additional case which does not fail.

Each test case includes commands which first set up predetermined input conditions in the unit under test, then allow one or more clock pulses to be transmitted to the unit under test, then determine the output states produced by these pulses and then compare the actual output states with the predicted output states which would result whenever the unit is operating properly. If this comparison fails during the first test case of a test string, then an error flip-flop is set. If the comparison is successful during any subsequent test case of this same test string, the error flip-flop will reset. Consequently, the error flip-flop will be set at the end of a test string only if every test case within the string failed. Such failure of an entire test string thus manifests the diagnosis of a particular error condition.

In one embodiment of the present invention, intermittent failures may be detected. A second error flip-flop is provided and each test case within a string is repeated a predetermined number of times. The second error flip-flop is set whenever inconsistent comparisons are made with respect to a single test case. Such inconsistent comparisons are indicative of intermittent failures within the unit under test.

When the system of the present invention is utilized for the purpose of diagnosing error conditions within a unit under test, means are provided to halt the test routine only if the error flip-flop remains set at the end of a test string within the routine. Alternatively, if the system of the present invention is utilized to detect rather than diagnose error conditions, means are provided to halt the test routine in response to a comparison failure during any test case within the routine.

Since, according to the present invention, the sequence in which test cases are executed is not dependent upon the results of previous test cases, an entire test routine may advantageously be stored on magnetic tape and the test cases of the routine executed serially in the order in which they are stored on the tape. Additionally, test routines designed for the testing of various units within a data processing system may advantageously be stored on separate tapes. Consequently, the need for expensive random access storage devices permanently reserved for the storage of test routines is eliminated. Moreover, a sufficient number of test cases may easily be included within each test routine to provide the routines with diagnostic power sufficient to diagnose errors in the tested units down to the replaceable component level. Thus, for example, the apparatus and method of the present invention may be utilized with respect to systems employing integrated circuit chips, large numbers of which are disposed on each of a large quantity of circuit cards, and will be able to diagnose errors down to a section within an individual chip.

BRIEF DESCRIPTION OF THE DRAWINGS

The manner of operation of the present invention and the manner in which it achieves the above and other advantages may be more clearly understood by reference to the following detailed description when considered with the drawings in which.

DETAILED DESCRIPTION

Figure 1:
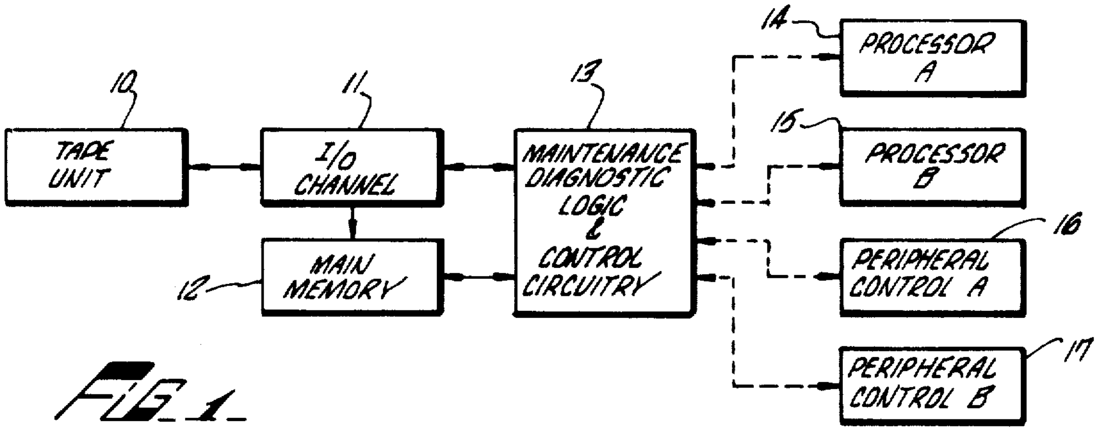
FIG. 1 depicts a general block diagram of a data processing system adapted to utilize the present invention.

FIG. 1 depicts a general block diagram of a data processing system adapted to utilize the error detection and diagnosis system of the present invention. Tape unit 10 represents a conventional tape transport adapted to transmit digital information stored on magnetic tapes via input-output channel 11 to core memory 12. A separate reel of tape is advantageously utilized to store test routines for each separate unit within the processing system which may be tested. If there are two identical units which may be tested one reel would, however, be sufficient for both.

When a particular unit is desired to be tested, the reel containing the test routine for that unit is inserted into tape unit 10 and a first block of test cases will be transmitted via input-output channel 11 to core memory 12. The magnetic test tape has blocks of test cases stored therein. Each test case comprises a group of command words. Additionally, the test cases are grouped into test strings as described in detail hereinafter.

Test cases are read from the tape unit 10 a block at a time, transmitted via input-output channel 11, and stored in predetermined addresses in memory 12. During the period associated with gaps between blocks on the test tape, commands stored in memory 12 will be serially fetched and executed by maintenance diagnostic logic and control circuitry 13. The predetermined unit to be tested is at this time cabled to circuitry 13.

Examples of units within the overall system which might be tested in accordance with the present invention are processor 14, processor 15, peripheral control unit 16, and peripheral control unit 17. These units are shown connected to circuitry 13 by dotted lines indicative that only the particular unit being tested is at any time actually coupled to circuitry 13.

After a block of test cases has been stored in memory 12, circuitry 13 will serially fetch and execute these test cases in a manner described in greater detail hereinafter. Upon the completion of execution of this block of test cases the next such block will be read from tape unit 10, transmitted via input-output channel 11, stored in memory 12, and subsequently serially executed by circuitry 13. Such execution of blocks of test cases will continue until the result of such execution indicates that an error has been detected or located within the unit under test. At this time, execution of the test routine is halted.

Input-output channel 11 may comprise a magnetic tape input-output channel of a type known in the art. It receives blocks of test cases from tape unit 10 and advantageously checks them for parity errors before transmitting them into predetermined locations within memory 12. It advantageously includes counting means for determining the completion of storage in memory 12 of a full block of test cases. Memory 12 is advantageously the main memory of the overall data processing system and advantageously is of the magnetic core or thin film variety.

Logic and control circuitry 13 contains means for serially fetching and executing the command words comprising the test cases stored in memory 12. The fetch of these command words proceeds in a well-known manner and their execution in accordance with the principles of the present invention will be described in greater detail hereinafter. Should circuitry 13, during the run of a test routine, detect an error or diagnose the location of an error within the unit being tested, it will stop the test routine run by transmitting a signal indicative of such error condition to input-output channel 11 which in turn will stop tape transport 10.

Figure 2:
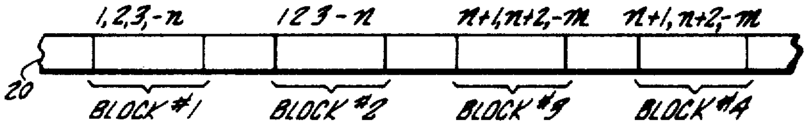
FIG. 2 depicts the format of a test routine stored on magnetic tape and which may be utilized in the present invention.

FIG. 2 depicts an exemplary format of a test routine stored on magnetic test tape 20. FIG. 2 depicts a portion of test tape 20 including four blocks of test cases. In FIG. 2 the first and second blocks are identical, and the third and fourth blocks are also identical. If input-output channel 11 detects a parity error within the first block, this block will be discarded and the second block will be stored in memory 12. Should the attempt to read the latter block from tape transport 10 also detect a parity error, channel 11 will cause unit 10 to stop. If the first block does not contain a parity error it will be stored in memory 12 while the second block is discarded. Similarly, detection of a parity error in the first block will result in its being discarded and the second block will be stored in memory 12 so long as a parity error is not also detected in it as well. As shown in FIG. 2, the first two blocks contain the first $n$ test cases of a test string while the next two blocks contain test cases $n+1$ through $m$ of the same test string. An entire test string need not be included within a single block but a test case should not be interrupted by an interblock gap.

Each test case within a string will contain a number of command words. Execution of these commands will first set up predetermined initial conditions in the unit under test, will then allow one or more clock pulses to be transmitted to the unit under test, will then determine particular output states resulting in the unit under test, and will then compare these actual output states with the predicted output states which would result when the unit is operating properly. In addition, execution of the first test case of a string will cause an error flip-flop to be set if the comparison fails. Execution of the subsequent test cases of the string will reset the error flip-flop if any such comparison is successful during execution of any succeeding test case of the string. Each test case, other than the last test case of a string, will include a command indicating that the test case has ended; the last test case of the string will include a command indicating that the string has ended. In addition, each test case will include a final command, execution of which will cause each test case to be fully reexecuted a predetermined number of times, whenever the present invention is being utilized to detect possible intermittent errors.

Figures 3A, 3B:
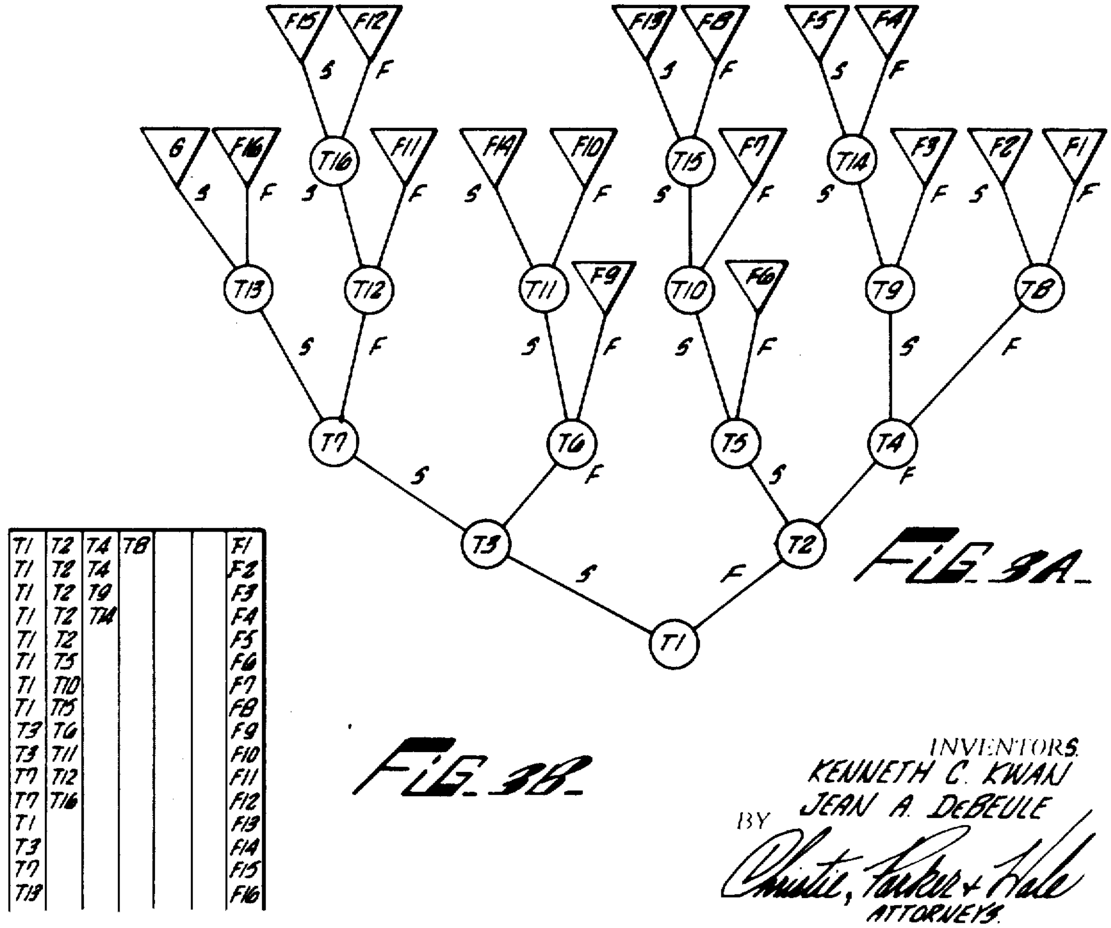
FIGS. 3A and 3B graphically depict a comparison between a prior art technique for executing test cases and the procedure utilized by the present invention.

FIGS. 3A and 3B depict a graphical comparison between a prior art "branching" technique for execution of a test program and the approach utilized by the present invention. In the "branching" technique, the sequence in which test cases are executed is determined by the results of these test cases. Thus in FIGS. 3A and 3B, T1 through T16 represent 16 different test cases. F1 through F16 represent 16 different failure conditions which may be diagnosed by the "branching" arrangement depicted in FIG. 3A. Test case T1 is executed first and the subsequent sequence in which other test cases are executed is determined by the results of the first and subsequent test cases.

For example, a successful execution of test case T1 is followed by execution of test case T3, upon the failure of which test case T6 is executed, upon the success of which test case T11 is executed, and upon the failure of which failure condition F10 is diagnosed. Similarly, failure condition F13 is diagnosed only if test case T1 fails, test case T2 succeeds, test case T5 succeeds, test case T10 succeeds, and test case T15 succeeds. It is apparent that use of a "branching" technique such as that depicted in FIG. 3A requires random accessing of these test cases and, consequently, their storage in a random access device. The consequence of utilizing such a "branching" technique is that the use of a sufficiently large number of test cases to accomplish diagnosis of failure conditions down to the replaceable component level is not feasible from an economic standpoint. Additionally, use of such an approach requires that an expensive random access storage device be set aside within the system solely for test programs. Since diagnostic power sufficient to diagnose error conditions to the replaceable component level is not economically obtainable by means of systems using such "branching" techniques, a necessary corollary is that maintenance men must spend a considerable period of time in isolating error conditions, thereby increasing the mean-time-to-repair for the system after an error has been detected.

FIG. 3B depicts a table in which the 16 test cases of FIG. 3A have been arranged in 16 test strings in accordance with the principles of the present invention. Each string is associated with a particular one of the 16 failure conditions shown in FIG. 3A. Thus, for example, failure condition number F1 has a test string associated therewith which is made up of test cases T1, T2, T4, and T8. It may be seen from FIG. 3A that this failure condition is specified by the failure of each one of these test cases. Thus, only if all of the test cases, T1, T2, T4 and T8 fail, is failure condition F1 diagnosed. It may further be seen from the table of FIG. 3B that the test strings are grouped such that the strings having a larger number of test cases precede those with smaller numbers of test cases. This results from the fact that an entire test string fails only if every one of the test cases which comprise that string fails. Failure of every test case within a shorter string correctly diagnoses a particular error condition only if all longer strings, which also include all test cases of the shorter string, have been previously executed and have not failed. Thus, the second test string in FIG. 3B contains test cases T1, T2, and T4 which also are included in the first test string. Failure of the second test string is meaningful as a diagnosis of failure condition F2 only if the first test string had previously been executed and had not failed since it included a test case, T8, which succeeded. Similarly, it may be seen that the test string comprising the single test case T1, failure of which will diagnose failure condition F13, is meaningful only if all of the first eight test strings has previously been executed and none had failed. Thus, it may be seen that all 16 failure conditions shown in FIG. 3A may be diagnosed in serial fashion, without requiring storage of test cases in random access device, by means of serially executing the 16 test strings shown in FIG. 3B. While the sequence of test cases within each of these test strings may be completely arbitrary, it is necessary that the sequencing of the test strings be such that longer strings are executed prior to shorter ones.

Figure 4A:
FIGS. 4A, 4B and 4C depict exemplary formats of command words which may be included in the test cases utilized in the present invention.
Figure 4B:
Figure 4C:

FIGS. 4A, 4B and 4C depict exemplary formats of command words which may be included in the test cases utilized in the present invention. In the embodiment of the present invention described herein, each test case within a string comprises seven different commands. The first test case of each string will include the following seven commands, the function of which will be described subsequently:

1. "Scan-In"
2. "Test"
3. "Scan-Out"
4. "Compare"
5. "Set Error" ("reset error")
6. "End" ("end string")
7. "Set Address"

Test cases in each string subsequent to the first test case will include a "Reset Error" command in place of the "Set Error" command and the final test case of each string will include an "End String" command in place of the "End" command.

The format of the "Scan-In" command is depicted in FIG. 4A. For purposes of illustration herein, all of the command words are depicted as comprising 16 bits. With respect to the "Scan-In" command, the first 2 bits comprise operation code bits which identify the command as a "Scan-In" command. The following 6 bits comprise address bits which define the location of a particular group of eight flip-flops within the unit under test. The final 8 bits of the command manifest binary data bits which are to be stored in respective ones of the eight flip-flops defined by the address.

The "Test" command also utilizes the command format depicted in FIG. 4A. The operation code bits identify this command as a "Test" command. The remaining bits of the command are ordinarily not used during the execution of a test case. The execution of a test case allows a clock pulse to be fed to the unit under test. During this period the entire "Test" command is stored in an information register associated with the main memory and bits stored in the remaining locations of the "Test" command word could at this time be utilized with respect to auxiliary control functions. Such use of this portion of the "Test" command is not a part of the present invention and will not be discussed herein.

The "Scan-Out" command also utilizes the command format shown in FIG. 4A. The two operation code bits are used to identify this command as a "Scan-Out" command. The address bits identify a particular group of eight flip-flops within the unit under test and execution of the "Scan-Out" command will determine the conditions of these flip-flops. The data bits within the command are not used.

The format of the "Compare" command is depicted in FIG. 4B. This format utilizes a 16 bit command word, the first 8 of which comprise operation code bits while the remaining 8 comprise data bits. With respect to the "Compare" command, the operation code bits identify the command as the "Compare" command while the data bits identify predetermined conditions expected to be manifested by the flip-flops identified by the address bits of the preceding "Scan-Out" command. During execution of the "Compare" command, a data field representative of the actual conditions read out from these flip-flops is compared with a data field representative of the expected conditions set forth in the "Compare" command. An EXCLUSIVE OR operation is performed with respect to these two data fields. Consequently, a resulting field is produced which has a binary 1 therein only in those positions with respect to which an unsuccessful comparison between the two data fields was made.

The "Set Error" command also utilizes the format of the command word depicted in FIG. 4B. Again the first 8 bits of the command word are utilized to identify the command as the "Set Error" command. The remaining data bits include binary 1's in only those bit positions which are to be examined. This data field thus constitutes a mask which enables the command to focus on those bit positions having binary 1's. During the execution of the "Set Error" command the data field of the command is combined by means of a logical AND operation with the field produced by execution of the preceding "Compare" command. Execution of the "Set Error" command will thus indicate whether an error has occurred in particular flip-flops of the unit under test and, consequently, whether the test case being executed has failed or succeeded. An indication of test case failure by the "Set Error" command will be utilized to set an error flip-flop within the system.

The "End" command also utilizes the command word format depicted in FIG. 4B. The first 8 bits within this command are utilized to identify the command as an "End" command, signifying the end of a test case. When the system is being used to detect errors, execution of the test routine will stop whenever the error flip-flop is set at the end of an "End" command. When the system is being utilized to diagnose error locations, however, the test routine will not stop in response to an "End" command. The data bit locations of the "End" command need not be used with respect to the present invention to manifest particular data bits, but may advantageously be utilized to identify the test case in which the command occurs. They may, for example, be advantageously utilized in conjunction with several additional "Scan-In" commands, inserted prior to the "End" command, to identify both the particular test case and the particular test string under execution, which information may be transmitted to display apparatus.

The "Set Address" command utilizes the command word format depicted in FIG. 4C. The first 4 bits of this command word comprise operation code bits utilized to identify the command as the "Set Address" command. The remaining 12 bits are utilized to manifest an address. The "Set Address" command is utilized only when the present invention is utilized to detect intermittent errors or for "debugging" purposes. Execution of the "Set Address" command causes each test case to be reexecuted. The address information in the "Set Address" command identifies the address in main memory which is just prior to the address in which the first command of the test case is located. Execution of the "Set Address" command causes these address bits to be inserted in the address register associated with the main memory. Consequently, the next fetch of a command from main memory will again fetch the initial "Scan-In" command of the test case just executed and will cause this test case to be reexecuted. When the system is utilized to detect intermittent errors, auxiliary circuitry discussed hereinafter allows the "Set Address" command to be executed a predetermined number of times thereby allowing each test case to be reexecuted a predetermined number of times.

The "Reset Error" command which is substituted for the "Set Error" command in all test cases subsequent to the first test case of a string, also utilizes the command format depicted in FIG. 4B. The first 8 operation code bits are used to identify the command as a "Reset Error" command while the remaining 8 bits comprise a mask having a binary 1 in those bit positions which are to be examined. When the system is utilized to diagnose error conditions, execution of the "Reset Error" command proceeds in a manner similar to that of the "Set Error" command. If the test case fails, the "Reset Error" command allows the error flip-flop to remain in its set condition if it had been set by a previous test case. If, however, execution of the "Reset Error" command indicates that the test case has not failed, auxiliary circuitry is then used to reset the error flip-flop. Thus, at the end of a test string the error flip-flop will be in its set condition only if every test case within the string has failed. When the system is utilized to detect error conditions, however, auxiliary circuitry is used to set the error flip-flop whenever execution of the "Reset Error" command indicates that a test case has failed.

The "End String" command used in place of the "End" command by the last test case of a string utilizes the command format depicted in FIG. 4B. The first 8 operation code bits are thus utilized to identify the "End String" command. As with the "End" command, the remaining data bit locations are not utilized to manifest data bits but may advantageously be utilized to identify the test string in which the command occurs.

Additionally, other commands may be utilized within the test cases to effectuate other auxiliary operations not a part of the present invention and such commands will not be discussed herein.

Figure 5:
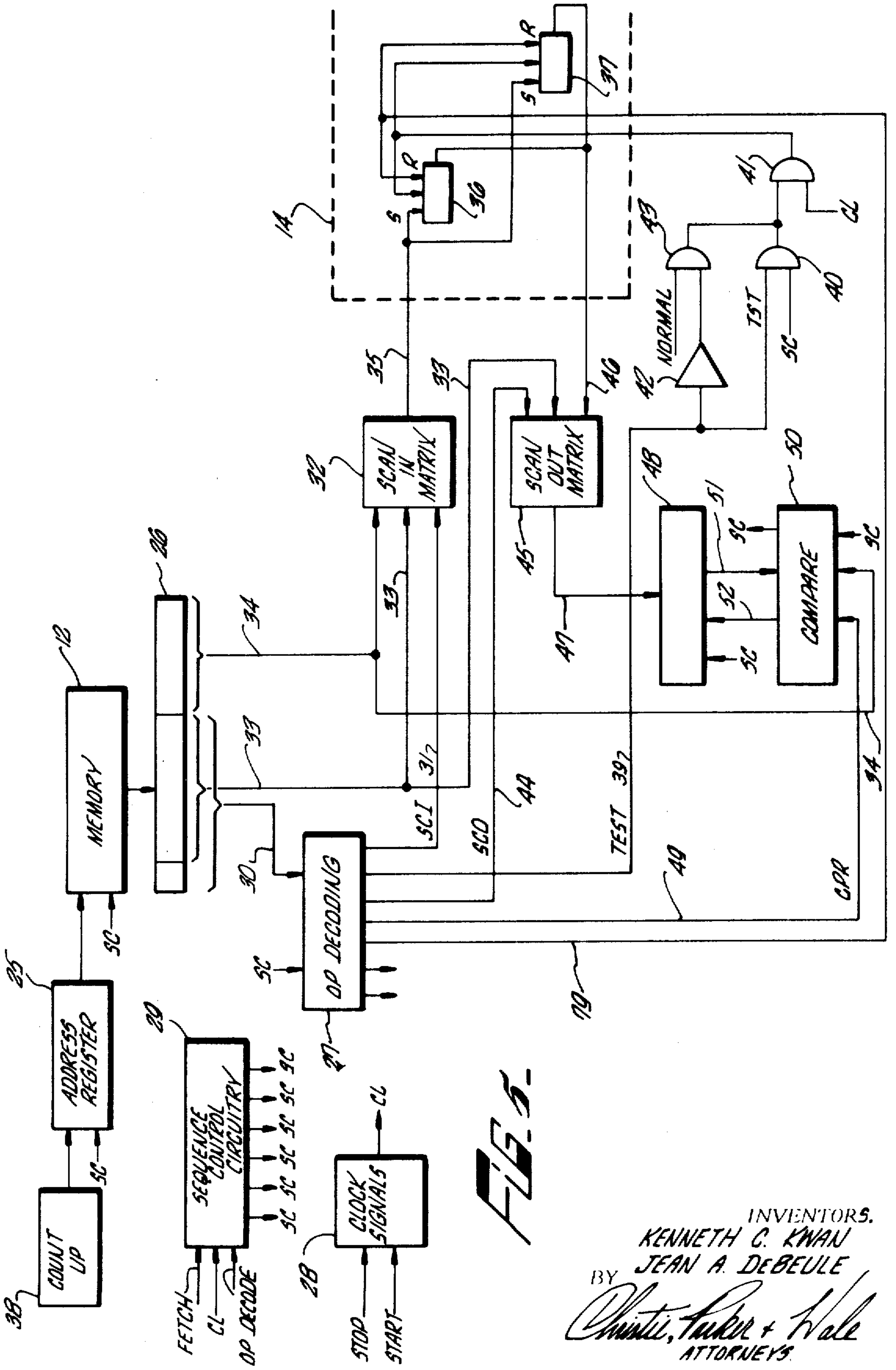
FIG. 5 depicts in block diagram form circuitry within the general diagram of FIG. 1 which may be utilized to carry out the present invention.

FIG. 5 depicts in block diagram form, circuitry forming a part of circuitry 13 within the general diagram of FIG. 1, which may be utilized to carry out the present invention. In addition, FIG. 5 depicts main memory 12, its associated address register 25, information register 26, and unit 14 as the unit selected for testing. It depicts decoding circuitry 27 which decodes operation code bits of commands read out of memory 12 into register 26. Decoding circuitry 27 presents signals on output lines which manifest the particular command stored in register 26. FIG. 5 also depicts a source 28 of clock signals $C_L$ utilized by the entire data processing system. Sequence control circuitry 29 comprises circuitry of a well-known type which provides sequence control signals SC which are utilized to govern the sequence of operations performed by the circuitry shown in FIG. 5. The execution of the first four commands of a test case by the circuitry depicted in FIG. 5 will now be discussed.

Subsequent to the reading of a block of test cases from tape unit 10 via input-output channel 11 into main memory 12, circuitry 13 will effectuate the serial reading of test cases from memory 12 and the execution of these test cases. Initially, circuitry 13 will fetch the first command of the block from memory 12 and store it into register 26 in a well-known manner. When a fetch of a command is to be executed, circuitry within block 13 of FIG. 1 (not shown herein) will provide a signal on the fetch input line of sequence control circuitry 29. Address register 25 at this time stores the address of the first command within the block and, under the control of signals from control circuitry 29, this first command is read into information register 26. This command will be a "Scan-In" command which therefore is in the format depicted in FIG. 4A. Under the control of circuitry 29, decoding circuitry 27 receives, via lines 30, the first 8 bits of the command stored in register 26. Decoding circuitry 27 decodes the received operation code bits in a well-known manner and provides signals on its output lines indicative of the particular command being executed. Thus, with respect to the initial "Scan-In" command, decoding circuitry 27 will provide signals on a group of lines indicated for illustrative purposes in FIG. 5 as single line 31.

Signals on lines 31 are transmitted to scan-in matrix 32. Additionally, signals manifesting address bits in register 26 are transmitted to matrix 32 via lines 33, and signals manifesting data bits in register 26 are transmitted to matrix 32 via lines 34. In response to the signals presented on lines 31, 33 and 34, matrix 32 will provide signals on lines 35. These signals serve to establish in a group of flip-flop circuits identified by the address bits in register 26, the data conditions manifested by the data bits in register 26. Two such flip-flop circuits, namely circuits 36 and 37 are depicted in FIG. 5. These flip-flops may advantageously be of the JK-type and lines 35 are connected to the "set" inputs of these flip-flops.

At the completion of execution of one or more "Scan-In" commands, predetermined initial conditions will have been established in identified flip-flops within unit 14. Sequence control circuitry 29 then enables count up circuit 38 to increase by 1 the contents stored in register 25. Register 25 will then store the address in memory 12 of the next command of the test case under execution, namely the "Test" command.

This "Test" command will next be fetched from memory 12, stored in register 26, and the first 8 bits thereof decoded by circuitry 27. Decoding circuitry 27 will then present a signal on line 39 indicative of the presence of the "Test" command in register 26. The signals on line 39, control circuitry 29, and AND gates 40 and 41 enable a single clock pulse to be transmitted to all of the flip-flops within unit 14 during execution of the "Test" command. Normally all clock pulses are transmitted to the flip-flops within unit 14, but except for the one selected clock pulse, they are inhibited from reaching these flip-flops by inverter 42 and gate 43 during execution of each test case.

Upon completion of the "Test" command, the next command, namely the "Scan-Out" command, is read into register 26 and its operation code bits decoded by circuitry 27. Decoding circuitry 27 will, at this time, present signals on the lines indicated for purposes of illustration in FIG. 5 as the single line 44. These lines 44 are then connected to scan-out matrix 45. Address bits of the command stored in register 26 are transmitted to scan-out matrix 45 by lines 33 and bits manifesting the contents of flip-flops within unit 14 are transmitted to matrix 45 by lines 46. As a result of these signals presented to matrix 45, it presents signals on eight output lines 47 indicative of the resultant states of the particular group of eight flip-flops identified by the address field of the "Scan-Out" command. The eight lines 47 cause storage of bits indicative of the resultant states of these flip-flops in register 48.

Subsequently, the next command, namely the "Compare" command, is read out of memory 12 and stored in register 26. The operation code bits of this command are also decoded by circuitry 27 and, as a result, signals are presented on the lines 49, shown in FIG. 5 as a single line. The signals on lines 49 are transmitted to compare circuitry 50 along with signals on lines 34 indicative of the expected resultant states of the particular group of flip-flops within the unit 14 under test. Thus, bits manifesting the actual resultant states are at this time stored in register 48 while bits manifesting the expected resultant states are presented to compare circuit 50. The contents of register 48 are, at this time, presented to compare circuit 50 by lines 51, under the control of circuitry 29. An EXCLUSIVE OR operation is performed upon corresponding bits of the actual and expected resultant states and the result of the EXCLUSIVE OR comparison is retransmitted to register 48 via lines 52, also under the control of circuitry 29. Consequently, at the end of the execution of the "Compare" command, an 8 bit data field is stored in register 48 and any discrepancy between the two compared fields is manifested by a binary 1 stored in register 48 in the bit position of any pair of compared bits which thus failed to match.

Before continuing the discussion of the execution of test case commands, the scan-in matrix 32 and the flip-flops within unit 14 will first be discussed in somewhat greater detail.

Figure 6:
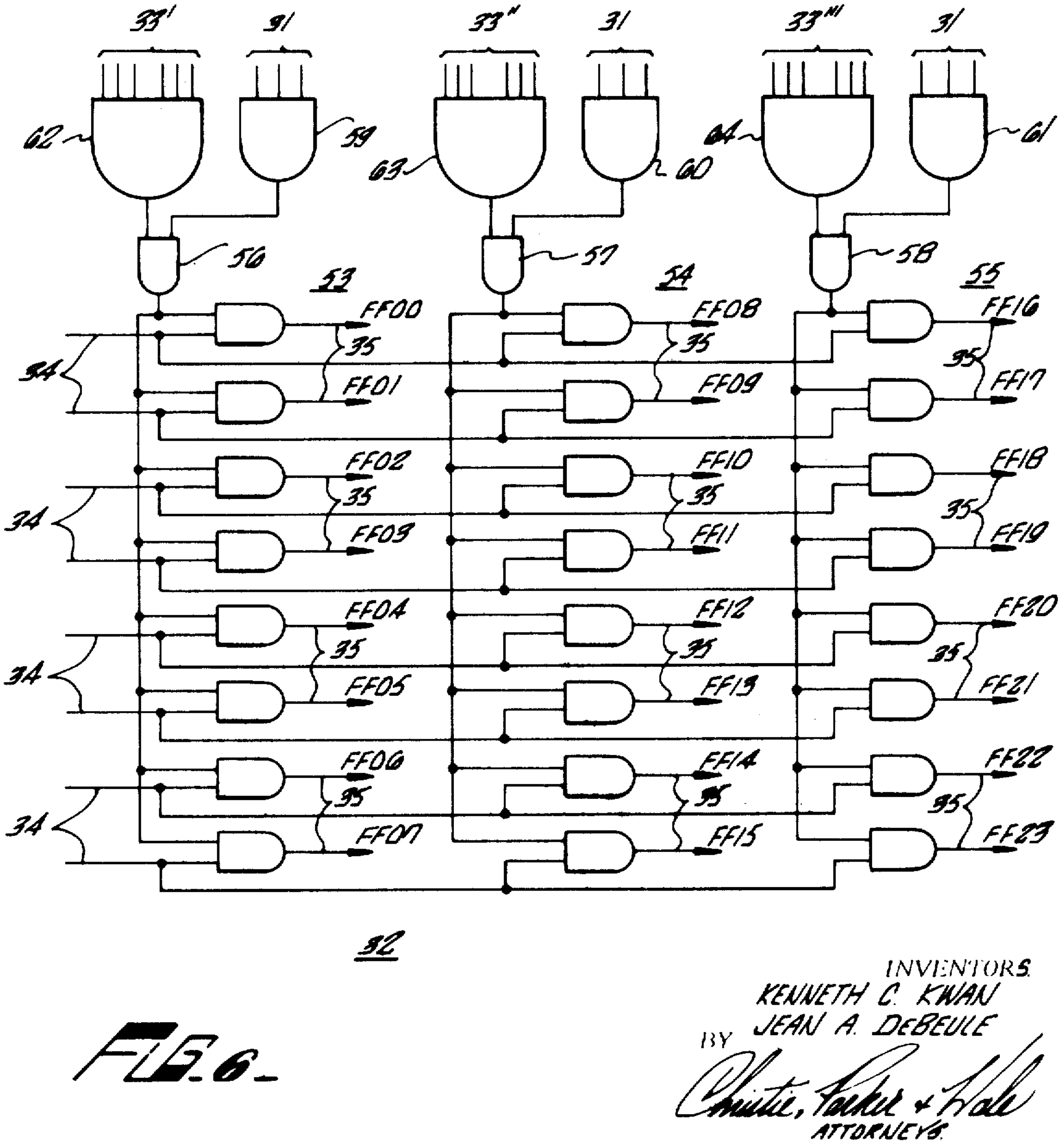
FIG. 6 depicts a portion of the scan-in matrix of FIG. 5.

FIG. 6 depicts a portion of scan-in matrix 32. Three columns 53, 54, and 55 of AND gates, each of which includes eight AND gates are depicted. Each of these columns of AND gates is associated with a particular group of eight flip-flops within unit 14. The output of each of the AND gates in the columns 53, 54, and 55 is transmitted to a different one of the flip-flops. Thus, the AND gates in column 53 are respectively associated with the flip-flops designated FF00 through FF07, the AND gates in column 54 are respectively associated with the flip-flops designated FF08 through FF15, and the AND gates in column 55 are respectively associated with flip-flops designated FF16 through FF23.

Column-select gates 56, 57, and 58 are used to select the columns 53, 54, and 55. The presence of signals on lines 31 from operation decoding circuitry 27, will enable each of the gates 59, 60, and 61. Signals on lines 31 indicate that a "Scan-In" command is to be executed. The signals on lines 33 in FIG. 5 manifest a particular group of eight flip-flops. The groups associated with the respective columns 53, 54, and 55 are three such groups. Different particular combinations of signals on lines 33 will enable the gates 62, 63, and 64. Three such particular combinations of signals on lines 33 which respectively enable the gates 62, 63, and 64 are presented on lines 33'33" and 33'''.

The particular data to be scanned into a selected group of flip-flops is presented to the matrix 32 via lines 34. Thus, the presence of operation code bits manifesting a "Scan-In" command will enable each of the gates 59, 60, and 61; address bits within the command will enable one of the gates 62, 63, and 64; and data bits within the command are manifested by signals on lines 34. As a consequence, a particular one of the gates 56, 57, and 58 is enabled and data signals on lines 34 are passed by the gates in a particular one of the columns 53, 54, and 55 to the predetermined group of flip-flops in unit 14.

Figures 7, 8:
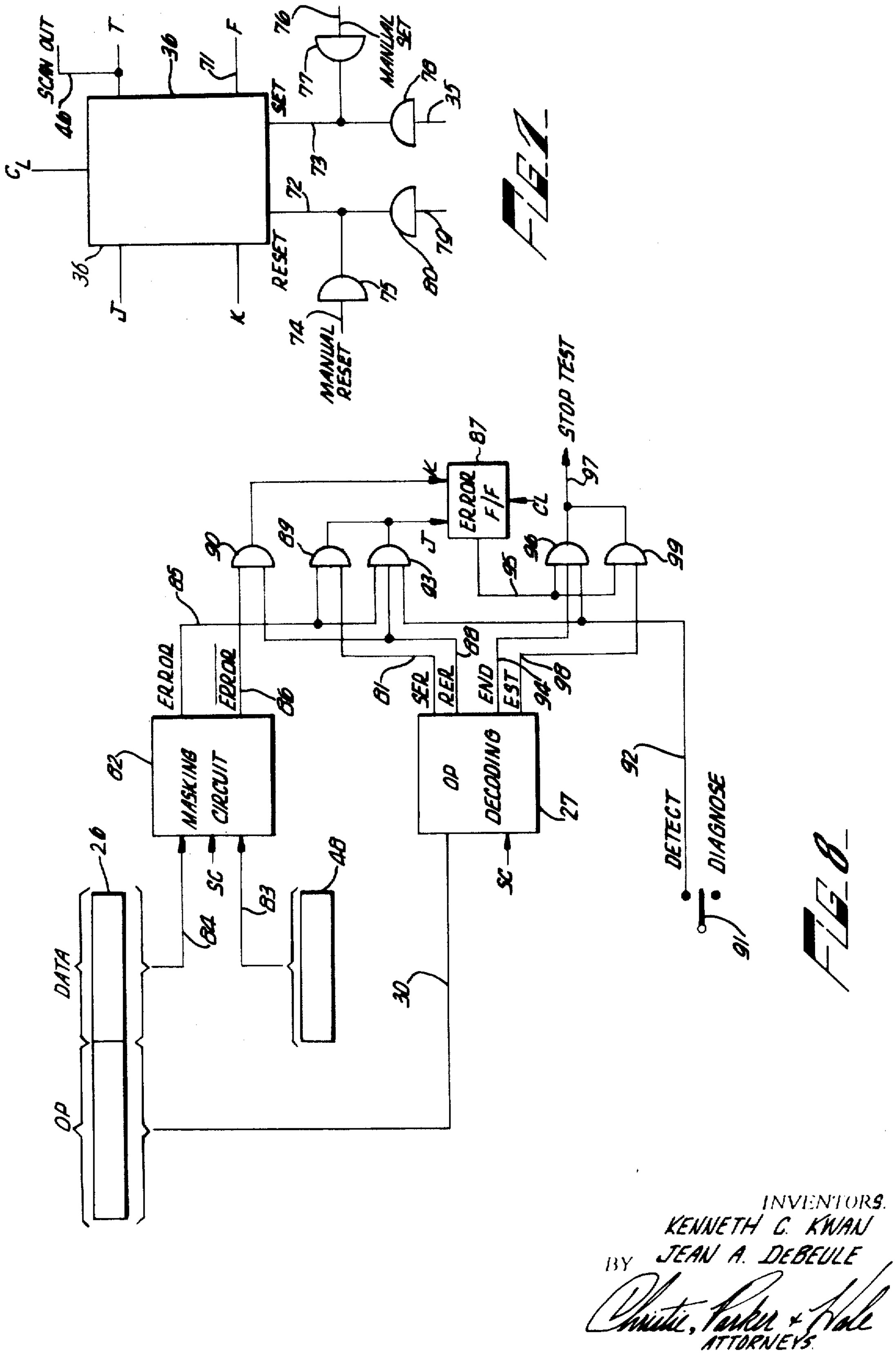
FIG. 7 depicts the manner in which each flip-flop circuit within the unit 14 of FIG. 5 is accessed.
FIG. 8 depicts in block diagram form circuitry controlling a flip-flop circuit, the condition of which manifests detection or diagnosis of error conditions.

FIG. 7 depicts flip-flop circuit 36 and illustrates the manner in which this flip-flop is accessed. Flip-flop 36 is of the well-known "clocked" or JK-type. Thus it will be set by a clock signal $C_L$ on its clock input whenever a signal is simultaneously present on its J input terminal and will be reset by a clock signal whenever a signal is simultaneously present on its K input terminal. When in a set condition, the flip-flop will be considered to be storing a binary 1 or to be indicating a logical "true" condition and a signal indicative of such binary 1 or logical "true" state is presented on line 46; similarly, when in its reset condition the flip-flop presents a signal on line 71 indicative of a binary 0 or of a logical "false" condition. In addition to the clocked inputs, the flip-flop may be reset by a signal presented on line 72 and may be set by a signal presented on line 73. It may be manually reset by a signal presented on line 74 which enables gate 75 and may be manually set by a signal presented on line 76 which enables gate 77. In addition, it may be set by a signal presented on scan-in line 35 from scan-in matrix 32 which enables gate 78 and it may be reset by a signal presented on line 79 which enables gate 80. As shown in FIG. 5, a signal is presented on line 79 from decoding circuitry 27. This signal is presented on line 79 by circuitry 27 whenever it determines that either an "End" command or "End String" command is present. The scan-out matrix 45 as shown in FIG. 5 operates in a manner similar to that of the scan-in matrix 32 depicted in FIG. 6.

Execution of the remaining commands will now be described in connection with FIGS. 8 and 9. FIG. 8 depicts the manner in which the "Set Error," "Reset Error" and "End String" commands are executed.

Following the execution of the "Compare" command discussed in connection with the description of FIG. 5, the next command within the first test case of a string is the "Set Error" command. When this command has been fetched and read into register 26, its operation code bits are again decoded by decoding circuitry 27 and a signal is presented on line 81. At this time register 48 contains the results of the previously executed "Compare" command and has a binary 1 in those bit positions within register 48 with respect to which the comparison failed.

During any given test case, it is common that the presence of errors in most of the bit positions within register 48 is immaterial. This results since the test case is directed to the determination of the presence of an error with respect to only a few, and usually only one, of the bit positions. The bit positions which are to be examined are manifested by the presence of a binary 1 in corresponding bit positions of the data field of the "Set Error" command stored in register 26. The contents of register 48 are transmitted to masking circuit 82 by lines 83 and the contents of the data field in register 26 are transmitted to the masking circuit 82 by lines 84. Masking circuit 82 then determines whether a failure was detected during the execution of the "Compare" command with respect to any of the bit positions corresponding to the bit positions of the data field transmitted via lines 84 which have binary 1's stored therein. Only if a failure occurred with respect to the one or more bit positions identified by the "Set Error" command does the test case fail. Masking circuit 82 determines whether such a failure has in fact occurred and, if so, presents a signal level on line 85. If, on the other hand, no such particular failure occurred, masking circuit 82 presents a signal level on line 86.

If, during execution of the "Set Error" command, the failure of the test case has been detected, signals on lines 85 and 81 enable gate 89 which presents a signal on the J input of error flip-flop 87 thereby setting this flip-flop.

During all test cases of a test string subsequent to the first test case, a "Reset Error" command occurs in the same position within the test case as did the "Set Error" command of the first test case. Detection of a "Reset Error" command by decoding circuit 37 causes a signal to be presented on line 88. The "Reset Error" command also contains a masking field in the data field stored in register 26. In a manner identical to that described in conjunction with the "Set Error" command, the masking circuit 82 determines during execution of the "Reset Error" command whether a failure occurred with respect to the particular bit position or positions identified by the masking field. Again, such a failure results in an error level being presented on line 85 indicative of failure of the test case while the absence of such a failure results in a signal level being presented on line 86. If a signal is presented on line 86 in conjunction with a "Reset Error" command, gate 90 is enabled and a signal is presented on the K input of error flip-flop 87 thereby resetting this flip-flop.

Switch 91 is used to cause the circuitry in FIG. 8 to operate in either a "detection" mode or in a "diagnose" mode. When operating in "detection" mode, the switch 91 causes a signal level to be presented on line 92. When the circuit is operating in the "detection" mode, an error signal on line 85 occurring during execution of a "Reset Error" command will enable gate 93 and a signal is presented on the J input of error flip-flop 87 thereby setting this flip-flop. Thus, during the "detection" mode, flip-flop 87 will be set in response to failure of any test case as manifested by a signal on line 85, regardless of whether or not this condition occurred during a "Set Error" command or during a "Reset Error" command.

With the circuit operating in the "diagnose" mode, however, there is no signal presented on line 92 and consequently error flip-flop 87 is set in response to an error signal on line 85 only when such signal is presented during a "Set Error" command.

Upon completion of execution of the "Set Error" command or "Reset Error" command, an "End" command follows with respect to all test cases other than the last test case of a string. Upon the storage of an "End" command in register 26, decoding circuitry 27 will present a signal on line 94 indicating that the particular test case being executed has been completed. If an error was detected during this test case and the circuit is operating in the "detection" mode, signals will at this time be presented on lines 92 and 94 and a signal will be presented on line 95 indicating that flip-flop 87 is in a set condition. The presence of signals on lines 92, 94, and 95 will enable AND gate 96 thereby presenting a signal on line 97 which signal indicates that the test routine under execution should be stopped since an error has been detected.

If the circuit in FIG. 8 is operating in the "diagnose" mode an "End" command will never cause a signal to be presented on line 97. In the "diagnose" mode, such signal may be presented on line 97 only as a result of the "End String" command. When an "End String" command is stored in register 26, decoding circuitry 27 presents a signal on line 98. Error flip-flop 87 will, at this time, be in the set condition only if an error signal has been presented on line 85 with respect to every one of the test cases of the particular string. The presence of signals on lines 95 and 98, at this time, will enable gate 99 and thereby present a signal on line 97 again indicating that the execution of the test routine should stop. The presence of a signal on line 97 while the circuit of FIG. 8 is operating in the "diagnose" mode, is indicative of the failure of an entire test string. Knowledge of the string which failed may then be utilized to diagnose the location within the system under test of the error causing component.

Figure 9:
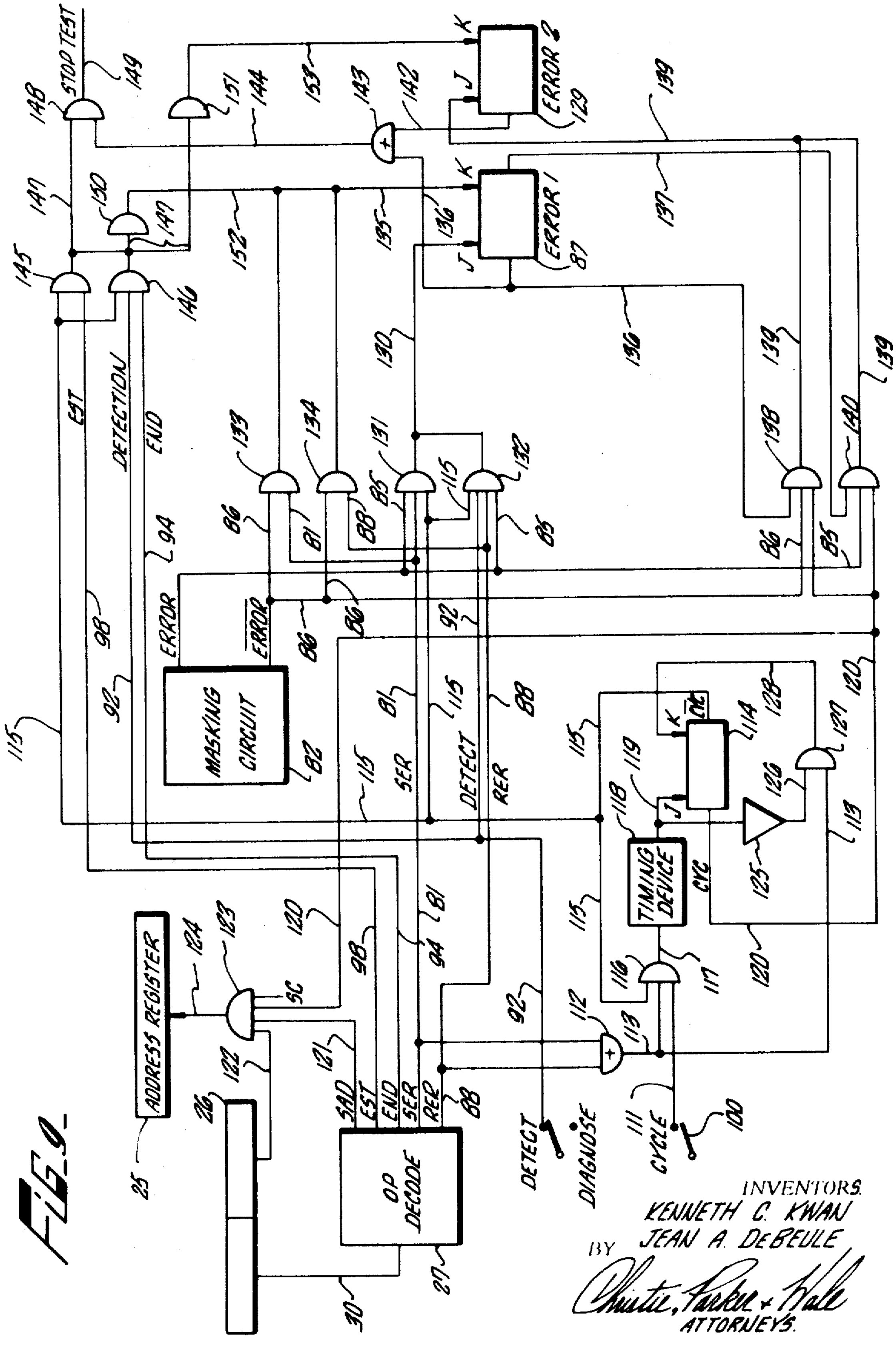
FIG. 9 depicts in block diagram form circuitry utilizable to effect the repetitive execution of each test case.

FIG. 9 depicts the manner in which the detection of intermittent error conditions is accomplished. Detection of intermittent errors is carried out during the "cycle" mode of operation. When cycle switch 100 is closed, a signal is presented on line 111 and the circuit operates in "cycle" mode. During the first execution of any test case, the reading into register 26 of either a "Set Error" or "Reset Error" command results in a signal being presented on lines 81 or 88 by decoding circuitry 27 which signal will enable OR gate 112 thereby presenting a signal on line 113. Cycle flip-flop 114, also of the JK-type, is at this time in a reset condition and therefore presents a signal level on line 115. The presence of signal levels on lines 111, 113, and 115 enables gate 116 and consequently presents a signal on line 117. The signal on line 117 triggers timing device 118. Timing device 118, may, for example, comprise a monostable multivibrator which, upon being triggered, remains in a triggered condition in which it presents a signal on line 119 for a fixed predetermined period of time. The signal level on line 119 is presented to the J input of flip-flop 114 thereby setting this flip-flop. With flip-flop 114 in a set condition, a signal is presented on line 120 rather than on line 115. It is this signal on line 120 which subsequently causes the test case to be reexecuted a fixed number of times.

Subsequent to the execution of the last command of a test case, whether this last command be an "End" command or "End String" command, a "Set Address" command will follow. The "Set Address" command, however, is executed only when a signal is present on line 120. With a "Set Address" command read into register 26, decoding circuitry 27 will present a signal on line 121. In addition to the operation code bits, the "Set Address" command includes a number of address bits which are presented on line 122. These address bits manifest the address in main memory 12 immediately preceding the address of the first command of the just completed test case. Signals on lines 121 and 120, under the control of circuitry 29, enable gate 123 which transfers the address bits on lines 122 via lines 124 to address register 25.

Address register 25 is subsequently incremented by 1, under the control of control circuitry 29, by count up circuitry 38 as shown in FIG. 5. Upon such incrementation the next command fetched from memory 12 will again be the "Scan-In" command of the test case which has just been completed. In this manner, this test case will be reexecuted so long as a signal is presented on line 120. At the end of a predetermined period of time, however, timing device 118 runs out. When this occurs a signal level is no longer presented on line 119 and, as a result, inverter 125 presents a signal on line 126. When the next "Set Error" or "Reset Error" command is read into register 26, a signal will again be presented on line 113. Signals presented on lines 113 and 126 enable gate 127 thereby presenting a signal on line 128 to the K input of flip-flop 114. Consequently, flip-flop 114 will, at this time, be reset thereby again presenting a signal on line 115 and removing the signal from line 120. Consequently, when the "Set Address" command is again read into register 26, gate 123 will not transfer the address information on lines 122 into register 25 since line 120 no longer has a signal presented thereon. As a result, the next command, which will be the first command of a succeeding test case, will be read out of memory and execution of this test case will commence. In a manner identical to that just described, the "Set Error" or "Reset Error" command of this next test case will again activate timing device 118, set flip-flop 114, and thereby cause this test case also to be reexecuted a predetermined number of times until timing device 118 again runs out.

The purpose of the cycle mode is to detect intermittent errors by means of determining the consistency of results with respect to multiple executions of the same test case. Error flip-flop 129 is utilized during the detection mode to record such inconsistent test results. If at the end of the multiple execution of a test case, none of the executions failed, both flip-flops 87 and 129 will remain in the reset condition. If all executions of this test case failed, thus indicating a solid rather than an intermittent failure, then at the end of all of the executions of the test case flip-flop 87 will be in a set condition and flip-flop 129 in a reset condition. If, on the other hand, one or more, but not all, of the trials failed, then flip-flop 87 will be in a reset condition while flip-flop 129 will be in a set condition indicative of detection of an intermittent failure.

During the first trail of a test case, flip-flop 114 is initially in a reset condition and a signal is presented on line 115. If during execution of this first trial, masking circuit 82 detects failure of the test case thereby detecting an error, a signal is presented on line 85. If the test case being tried contains a "Set Error" command, a signal is subsequently presented on line 81 while if it contains a "Reset Error" command, a signal is presented on line 88. In either case a signal will be presented on line 130, in the former case via gate 131, and in the latter case via gate 132. This signal on line 130 is presented to the J input of flip-flop 87 thereby causing this flip-flop to be set. If, on the other hand, no error condition were detected by masking circuit 82 during the first trial, circuit 82 presents a signal on line 86. A "Set Error" command or a "Reset Error" command subsequently presenting a signal on line 81 or 88 will, in this case, enable gates 133 or 134, respectively, either of which will present a signal on line 135 to the K input of error flip-flop 87 thereby resetting this flip-flop. During all subsequent trials of this test case, a signal is presented on line 120 as previously discussed and there will be no signal on line 115.

At the end of the first trial, error flip-flop 87 presents a signal on line 136 if an error was detected during the first trial, and presents a signal on line 137 if no error was detected during the first trial. If an error was indicated during the first trial and during any subsequent trial the error is not detected, signals will be presented on lines 136, 86 and 120, enabling gate 138 and presenting a signal on line 139 to the J input of error flip-flop 129 thereby setting this flip-flop. At the same time signals are presented on lines 86 and 81, or on lines 86 and 88, depending upon whether the test case includes a "Set Error" command or "Reset Error" command, and a signal will be presented by either gate 133 or gate 134 to line 135 which signal is represented to the K input of flip-flop 87 resetting this flip-flop. Thus, at the end of any succeeding trial in which the error condition is not detected, flip-flop 87 will be in its reset condition while flip-flop 129 will be in its set condition. These conditions of the two flip-flops will then remain constant during all subsequent trials of this test case.

If during the first trial of the test case no error condition was detected, flip-flop 87, as has been seen, is in its reset condition at the end of this first trial. If during any subsequent trial of this test case an error is detected, signals will then be presented on lines 85, 120, and 137 thereby enabling gate 140 and consequently presenting a signal on line 139 on the J input of flip-flop 129 causing it to be set. Thus, again flip-flop 87 will be in a reset condition while flip-flop 129 is in a set condition thereby again indicating the presence of an intermittent error. Flip-flop 129 presents a signal on line 142 when it is in its set condition, this signal being indicative of an intermittent error.

As described previously, the running out of timing device 118 causes the last "Set Error" or "Reset Error" command to reset flip-flop 114 thereby again presenting a signal on line 115. The subsequent "End" command or "End String" command will then cause the test routine to stop if either a solid error or an intermittent error was detected during the multiple trials of the test case being executed. If either error condition was detected, a signal on line 136 or on line 142 at this time enables gate 143 which presents a signal on line 144. The presence of signals on lines 115 and 98 enables gate 145 and the presence of signals on lines 115, 92 and 94 enables gate 146. The enabling of either of gates 145 or 146 presents a signal on line 147. Signals on line 147 and on line 144 enable gate 148 which in turn presents a signal on line 149 which signal indicates that either a solid or intermittent error has been detected and that the test routine should stop. Additionally, the signal presented on line 147 enables gates 150 and 151. Gate 150 presents a signal on line 152 to the K input of error flip-flop 87 causing it to reset while gate 151 presents a signal on line 153 to the K input of flip-flop 129 causing it to reset. Gates 150 and 151 are utilized primarily for purposes of isolation.

Figure 10:
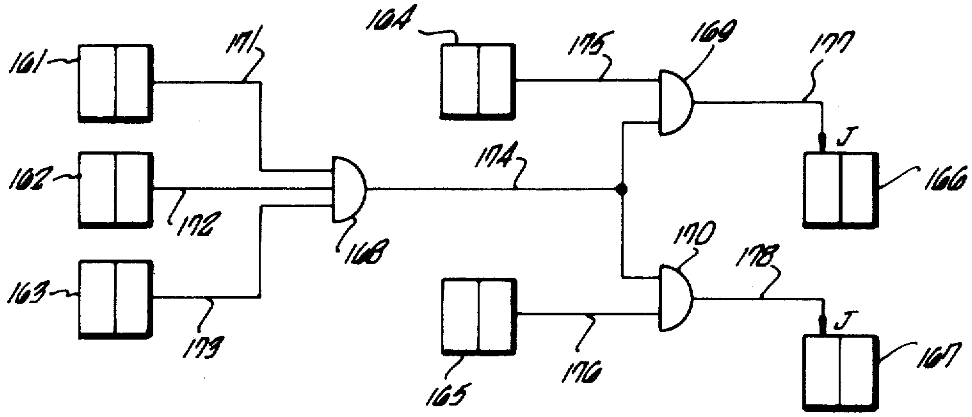
FIG. 10 depicts an exemplary portion of a unit which may be tested in accordance with the present invention and several exemplary test cases utilizable to detect and diagnose errors within this portion.

FIG. 10 depicts by way of example, the manner in which two test cases may be used in accordance with the principles of the present invention to locate the source of an error condition. FIG. 10 depicts an exemplary circuit which includes flip-flops 161 through 167 and AND gates 168, 169, and 170 and may comprise a portion of the unit 14 under test. Lines 171, 172, and 173 present signals to gate 168 when respective ones of the flip-flops 161, 162, and 163 are in the set condition. Simultaneous signals on these three lines enable gate 168 which then presents a signal on line 174 which is presented to gates 169 and 170. Line 175 presents a signal to gate 169 when flip-flop 165 is in the set condition and lines 176 presents a signal to gate 170 when flip-flop 165 is in the set condition. Simultaneous signals on line 175 and 174 enable gate 169 which then presents a signal on line 177 to the J input of flip-flop 166. Similarly, simultaneous signals on lines 174 and 176 enable gate 170 which then presents a signal on line 178 to the J input of flip-flop 167.

FIG. 10 also depicts two test cases which may be used to detect and diagnose errors caused by gates 168, 169 and 170. FIG. 10 depicts the bit format of each command within these test cases and also the addresses in main memory where the commands are located. Thus, the first "Scan-In" command of test case number zero is shown to be located at address 200 in main memory. The first 2 bits of this command comprise operation code bits, the next 6 bits comprise address bits which locate the address assigned to a particular group of eight flip-flops within the unit under test, and the last 8 bits depict the data field to be stored in these eight flip-flops. It will be assumed that the address designated 000000 will designate a group of eight flip-flops, the first seven of which are the flip-flops 161 through 167 respectively. The data field shown with respect to the "Scan-In" command indicates that execution of the "Scan-In" command will cause binary 1's to be stored in the flip-flops 161, 162, 163, and 164 while binary 0's will be stored in the remaining flip-flops. During execution of the succeeding "Test" command, a single clock pulse is presented to each of the flip-flops. Accordingly it may be seen that if the gates 168, 169, and 170 are all operating properly, flip-flops 166 and 167 will both be set as a result of execution of the "-Test" command. During the succeeding "Scan-Out" command the actual conditions of the flip-flops 161 through 167 are read out and stored. During the succeeding "Compare"c ommand, the data read out of the flip-flops 161 through 167 is compared with the expected condition of these flip-flops. The data field of the "Compare" command thus shows that each of the flip-flops 161 through 167 is expected to be in the 1 state. Upon execution of the "Compare" command, any flip-flop not in the state in which it was expected to be will cause a binary 1 to be stored in the comparison register in the bit position corresponding to the flip-flop found to be in an erroneous state. During the succeeding "Set Error" command, the test case fails and the error flip-flop set only if an error condition was previously detected by the compare command in single bit position identified by the single binary 1 in the data field of the "Set Error" command. Thus, the test case fails only if flip-flop 166, at the end of the test command, remains in the reset or O condition rather than having been set to the one condition. Next, the "End" command is executed and each of the flip-flops 161 through 167 is reset to its 0 condition. Finally, the "Set Address" command causes the entire test case to be repeated if the system is operating in "cycle" mode. The "Set Address" command comprises an initial 4 operation code bits followed by 12 data bits. These 12 data bits manifest, in binary coded decimal code, the address 199 which address is the address immediately preceding the address of the initial "Scan-In" command of this test case. Consequently, this test case will be repeated a predetermined number of times as described hereinabove if the "Set Address" command is executed.

Following execution of test case number zero, as just described, test case number one, also depicted in FIG. 10, will be executed. This test case follows immediately after test case number zero in the test routine being executed. As shown in FIG. 10, the execution of the "Scan-In" command of test case number one will set binary 1 's into flip-flops 161, 162, 163, and 165. During the succeeding "Test" command, a single clock signal will again be applied to all of the flip-flops 161 through 167. If the circuitry shown in FIG. 10 is operating properly, flip-flop 167 will at this time be set to a 1 condition while flip-flop 166 remains reset. During a succeeding "Scan-Out" command, the actual states of flip-flops 161 through 167 are read out. During the succeeding "Compare" command the actual conditions are compared with the expected conditions and any mismatch causes a binary 1 to be stored in the compare register in the bit position corresponding with the flip-flops with respect to which the mismatch occurred. During the next succeeding "Reset Error" command, the data field of this command masks all but the bit position of flip-flop 167 and only if an erroneous condition had been detected in this flip-flop will the test case fail. Thus, unless flip-flop 167 was in the 0 state subsequent to the "Test" command, the "Reset Error" command will reset the error flip-flop if it had previously been set. The next succeeding "End String" command will again clear all of the flip-flops 161 through 167 and the "Set Address" command will cause test case number one to be repeated a predetermined number of times if the system is operating in "cycle" mode. The "Set Address" command contains the address 206 in its address field which is the address immediately preceeding the address of the "Scan-In" command of test case number one.

If at the end of the two test cases just described, the error flip-flop remains in its set condition, thus indicating that both test cases failed, this result will identify the source of failure as gate 168. Failure of gate 168 is identified since this failure would cause both the error condition in flip-flop 166 detected by test case number zero and the error condition in flip-flop 167 detected by test case number one. If one of the two test cases failed while the other was successful, the test string comprising the two test cases would have succeeded. Two subsequent test strings, each comprising one of these two test cases, could then be utilized to identify the source of error. Thus, for example, if the test string comprising test cases zero and one shown in FIG. 10, had succeeded while a subsequent test string comprising only test case number zero had failed, such failure of this latter test string would indicate that the source of failure was gate 169. Similarly, failure of a test string comprising single test case number one would indicate that the source of error was in gate 170. Test case number one in this last-mentioned test string would, of course, include a "Set Error" command in place of the "Reset Error" command shown in FIG. 10.

Accordingly, it may be seen from the circuit shown in FIG. 10 and the two illustrative test cases set forth by way of example, how the detection and diagnosis system of the present invention operates with respect to the exemplary circuit shown in FIG. 10. The principle thus illustrated and as described hereinabove, may be utilized to detect and diagnose such error conditions in large computer systems containing many thousands of possible error conditions and may, in the manner described, be utilized to diagnose such error conditions.

Various circuits of types well known in the prior art have been depicted in block diagram form herein.

What have been described herein are considered to be only illustrative embodiments of the present invention. Accordingly, it is to be understood that various and numerous other arrangements may be devised by one skilled in the art without departing from the spirit and scope of this invention.

We claim:

1. In a digital data processing system having a plurality of discrete units, a system for determining error conditions within any of the discrete units comprising:
- means for storing a test routine directed to a selected one of the discrete units, the test routine comprising a plurality of test cases which are grouped into a plurality of test strings, each string including one or more test cases;
- means for serially executing the test cases of the routine in a predetermined order; and
- means for detecting the failure of all test cases within any test string of the routine.

2. In a digital data processing system, an error determining system according to claim 1 in which the executing means executes all test cases of each test string prior to executing any test cases of a succeeding test string and in which test cases of strings having larger numbers of test cases are executed prior to test cases of strings having fewer numbers of test cases.

3. In a digital data processing system, an error determining system according to claim 2 in which the storing means stores test strings in a sequence such that test strings having larger numbers of test cases precede test strings having fewer numbers of test cases.

4. In a digital data processing system, an error determining system according to claim 3 in which the storing means comprises magnetic tape.

5. In a digital data processing system, an error determining system according to claim 3 in which the means for executing the test cases comprises:
- means for setting the selected discrete unit to a predetermined initial state;
- means for feeding a single clock pulse to the discrete unit;
- means for determining the resultant state of the discrete unit effected by the clock pulse; and
- means for comparing the resultant state with a predetermined expected state.

6. In a digital data processing system, an error determining system according to claim 5 in which:
- each test case comprises a plurality of commands, each command being represented by a plurality of binary digits;
- the storing means comprises magnetic tape; and
- the commands are stored on the magnetic tape in blocks such that each block contains an integral number of test cases.

7. In a digital data processing system, an error determining system according to claim 5 in which:
- the comparing means comprises an EXCLUSIVE OR circuit for comparing bits in corresponding bit positions of two sets of binary digits respectively representing the resultant and predetermined expected states of the selected discrete unit and for presenting signals indicative of the bit positions with respect to which the comparison fails.

8. In a digital data processing system, an error determining system according to claim 7 in which:
- each test case comprises a plurality of commands, each command being represented by a plurality of binary digits; and in which the comparing means further comprises:
  - a masking circuit responsive to a particular command within each test case and to the signals provided by the comparing means for determining whenever the signals indicate failure with respect to a particular bit position identified by the command and for providing an error signal in response to such determination.

9. In a digital data processing system, an error determining system according to claim 8 in which the means for detecting test case failures comprises:
- a binary error element; and
- means operative during the first test case of each test string and responsive to the particular command and to the error signal for setting the error element to its first binary state.

10. In a digital data processing system, an error determining system according to claim 9 in which the means for detecting test case failures further comprises:
- means operative during each test case subsequent to the first test case of a test string and responsive to the particular command for resetting the error element to its second binary state in the absence of the error signal.

11. In a digital data processing system, an error determining system according to claim 10 further comprising:
- means responsive to the final command of each test case and to the error element being in its first binary state for providing a signal indicative of the detection of an error condition.

12. In a digital data processing system, an error determining system according to claim 10 further comprising:
- means responsive to the final command of the final test case of each test string and to the error element being in its first binary state for providing a signal indicative of the diagnosis of an error condition.

13. In a digital data processing system having a plurality of discrete units, a system for determining error conditions within any of the discrete units comprising:
- means for storing a test routine directed to a selected one of the discrete units, the test routine comprising a plurality of test cases which are grouped into a plurality of test strings, each string including one or more test cases, the test strings being sequenced within the routine such that test strings having larger numbers of test cases precede test strings having fewer numbers of test cases;
- each test case comprising a plurality of commands, each command being represented by a plurality of binary digits including operation code binary digits which identify the commands;

means for serially executing the test cases of the routine comprising:

decoding circuitry for decoding the operation code binary digits of each command and for presenting signals indicative of each unique command within the test routine;

means including a first matrix circuit responsive to signals from the decoding circuit indicative of a particular first command for setting the selected discrete unit to an initial state identified by at least one binary digit within the command;

means responsive to signals from the decoding circuit indicative of a particular second command for feeding a single clock pulse to the discrete units;

means including a second matrix circuit responsive to signals from the decoding circuit indicative of a particular third command for storing in a compare register binary digits manifesting the resultant state of the selected discrete unit effected by the clock pulse;

means including an EXCLUSIVE OR circuit responsive to signals from the decoding circuit indicative of a particular fourth command for comparing bits in corresponding bit positions of the compare register and a particular group of bit positions within the fourth command, bits in the latter bit positions manifesting the expected state of the selected discrete unit, and for providing signals indicative of the bit positions with respect to which the comparison failed; and means including a masking circuit responsive to signals from the decoding circuit indicative of a particular fifth command for determining whether the signals provided by the comparing means indicate a comparison failure with respect to a bit position identified by binary digits within the fifth command and for providing an error signal indicative of failure of a test case in response to such determination; and means for detecting the failure of all test cases within any test string of the routine.

14. In a digital data processing system, an error determining system according to claim 13 in which the determining means is also responsive to signals from the decoding circuit indicative of a particular sixth command for determining whether the signals provided by the comparing means indicate a comparison failure with respect to a particular bit position identified by binary digits within the sixth command and for providing an error signal indicative of failure of a test case in response to such determination.

15. In a digital data processing system, an error determining system according to claim 14 in which the first test case of each test string includes the particular fifth command and excludes the particular sixth command and all other test cases include the particular sixth command and exclude the particular fifth command.

16. In a digital data processing system, an error determining system according to claim 15 in which the means for detecting test case failures comprises:

a binary error element; and means responsive to the signals from the decoding circuit indicative of the particular fifth command and to the error signal for setting the error element to its first binary state.

17. In a digital data processing system, an error determining system according to claim 16 in which the means for detecting test case failures further comprises means responsive to the signals from the decoding circuit indicative of the particular sixth command for resetting the error element to its second binary state in the absence of the error signal.

18. In a digital data processing system, an error determining system according to claim 17 further comprising means responsive to signals from the decoding circuit indicative of a particular seventh command, the particular seventh command being the final command of the final test case of each test string, and to the error element being in its first binary state for providing a signal indicative of the failure of every test case of a test string.

19. In a digital data processing system, an error determining system according to claim 18 in which the test routine contains a particular eighth command after predetermined ones of the test cases and further comprises:

a normally "off" timing means;

means responsive to signals from the decoding circuit indicative of either the particular fifth or sixth commands and to the timing means being "off" for turning the timing means "on," the timing means remaining "on" for a predetermined period of time and providing a cycle signal while "on"; and means responsive to signals from the decoding circuit indicative of the particular eighth command and to the cycle signal for causing the executing means to repeatedly reexecute the preceding test case until the timing means again turns "off."

20. In a digital data processing system, an error determining system according to claim 19 further comprising:

a binary intermittent error element, the intermittent element normally being in its second binary state; and means responsive to the error signal, to the cycle signal and to the error element being in its second binary state for setting the intermittent error element to its first binary state.

21. In a digital data processing system, an error determining system according to claim 20 further comprising:

means responsive to the cycle signal and to the error element being in its first binary state for setting the intermittent error element to its first binary state, in the absence of the error signal.

22. In a digital data processing system having a plurality of discrete units, a system for determining error conditions within any of the discrete units, comprising:

means for storing a test routine directed to a selected one of the discrete units, the test routine comprising a plurality of test cases which are grouped into a plurality of test strings, each string including one or more test cases;

first binary error element;

a second binary error element;

means for serially executing the test cases of the routine in a predetermined order and for determining the success of such execution;

means for causing the executing means to reexecute predetermined ones of the test cases a predetermined number of times prior to execution of the next succeeding test case; and means for establishing a first binary value in the first error element in response to the failure of every execution of every test case within any test string and for establishing a first binary value in the second error element in response to the failure of at least one but less than all executions of any test case.

23. In a digital data processing system, an error determining system according to claim 22 in which the establishing means comprises:

means for establishing the first binary value in the first error element in response to failure of the first execution of the first test case of any test string; and means for establishing the second binary value in the first error element in response to the success of the first execution of any succeeding test case of the test string.

24. In a digital data processing system, an error determining system according to claim 23 in which the establishing means further comprises:

means for establishing the first binary value in the second error element in response to the success of the second or any subsequent execution of a test case, the first error element being in its first binary state.

25. In a digital data processing system, an error determining system according to claim 24 in which the establishing means further comprises:
means for establishing the first binary value in the second error element in response to the failure of the second or any subsequent execution of a test case, the first error element being in its second binary state.

26. In a digital data processing system having a main memory, means for receiving digital words from an auxiliary storage device and for storing them into predetermined locations within the main memory, a unit comprising a plurality of flip-flop circuits, and means for reading digital words from the main memory, a system for determining error conditions within the unit comprising:
first means coupled to the unit and responsive to a first "Scan-In" command word read from main memory for establishing, in flip-flop circuits identified by the command, initial conditions also identified by the command;
second means coupled to the unit and responsive to a first "Test" command read from main memory for enabling transmission of a clock signal to the flip-flop circuits;
third means responsive to a first "Scan-Out" command read from main memory for determining the resultant conditions in flip-flop circuits identified by the command;
fourth means responsive to a first "Compare" command read from main memory for comparing the resultant conditions with predetermined conditions identified by the command;
a bistable error element;
fifth means responsive to a "Set Error" command read from main memory for setting the error element to a first bistable condition in response to failure of the preceding comparison;
the first means also being responsive to a second "Scan-In" command word read from main memory for establishing in flip-flop circuits identified by the command initial conditions also identified by the command;
the second means also being responsive to a second "Test" command read from main memory for again enabling transmission of a clock signal to the flip-flop circuits;
the third means also being responsive to a second "Scan-Out" command read from main memory for determining the resultant conditions in flip-flop circuits identified by the command;
the fourth means also being responsive to a second "Compare" command read from main memory for comparing the last-mentioned resultant conditions with predetermined conditions identified by the command; and
sixth means coupled to the unit and responsive to a "Reset Error" command read from main memory for resetting the error element to its second bistable condition in response to the success of the preceding comparison.

27. In a digital data processing system according to claim 26:
a switch means, one position of the switch means indicating that error conditions are to be detected, another position of the switch means indicating that error conditions are to be diagnosed; and
a seventh means responsive to an "End" command read from main memory and to the switch being in its one position for determining the status of the error element and for providing a signal in response to the error element being in its first bistable condition.

28. In a digital data processing system according to claim 27:
an eighth means responsive to an "End String" command read from main memory and to the switch being in its other position for determining the status of the error element and for providing a signal in response to the error element being in its first bistable condition.

29. In a programmable digital data processing system having a plurality of discrete units, a method for determining error conditions within any of the discrete units under program control of the data processing system, the steps comprising:
storing a program test routine directed to a selected one of the discrete units, the test routine having a plurality of test cases which are grouped into a plurality of test strings, each string including one or more test cases;
executing serially the test cases of the routine in a predetermined order;
detecting the success or failure of each such test case execution; and
detecting the failure of all test cases within a single test string.

30. In a programmable digital data processing system, a method of determining error conditions according to claim 29 wherein the executing step comprises:
setting the selected discrete unit to a predetermined initial state;
feeding a clock pulse to the selected discrete unit;
observing the actual resultant state of the selected discrete unit effected by the clock pulse; and
comparing the observed resultant state with a predetermined expected resultant state.

31. In a programmable digital data processing system, a method of determining error conditions according to claim 30 wherein the storing step comprises:
arranging the test cases such that test cases of strings having larger numbers of test cases are executed prior to test cases of strings having fewer numbers of test cases.

32. In a programmable digital data processing system, a method of determining error conditions according to claim 31 in which the comparing step comprises:
comparing bits in corresponding bit positions of two sets of binary digits respectively representing the actual resultant and predetermined resultant states; and
indicating the bit positions with respect to which the comparison failed.

33. In a programmable digital data processing system, a method of determining error conditions according to claim 32 in which the step of detecting success comprises:
masking predetermined ones of the bit positions; and
providing error signals representative of unmasked ones of the bit positions with respect to which the comparison failed, the error signals being indicative of failure of the test cases.

34. In a programmable digital data processing system, a method of determining error conditions according to claim 33 in which the step of detecting failure comprises:
setting a first binary error element to a first binary state in response to an error signal occurring during the first test case of any test string; and
resetting the first binary error element to its second binary state in the absence of an error signal occurring during any test case of a test string subsequent to the first test case of the string.

35. In a programmable digital data processing system, a method of determining error conditions according to claim 34 further comprising:
repeatedly executing predetermined ones of the test cases a predetermined number of times; and
setting a second binary error element to its first binary state in response to detection of inconsistent results during the repeated execution of a single test case.

36. In a digital data processing system having circuits comprised of bistable devices controlled by clock pulses and a series of gating devices, system for determining errors in said circuits comprising:
means for storing test strings each comprising a series of test cases;
means for serially executing the test cases in each test string including means for setting at least one such bistable device to a predetermined state and for applying a clock pulse to such bistable devices;
means for detecting the presence of an error in the state of at least one bistable device after such clock pulse in all test cases in a test string.

37. In a digital data processing system according to claim 36 wherein said means for detecting comprises means settable to a first state in response only to an error in the first test case of a test string and settable to a second state in response to the lack of a failure in any test case in a test string subsequent to the first.

38. In a digital data processing system according to claim 37 wherein said test string comprises an end of string command at the end of each of said test strings and means for providing a predetermined output signal indicative of an error condition upon encountering said end of string command when said settable means is in said first state.

39. A method using a computing apparatus for determining errors in a system having circuits comprised of bistable devices controlled by a series of gating devices, the steps of such method comprising:

- providing in the computing apparatus test strings each comprising a series of test cases;
- serially executing said test cases in each test string setting at least one such bistable device to a predetermined state and applying a clock pulse to such bistable devices for each test case; and
- detecting the presence of an error in the state of at least one bistable device after each such clock pulse in all test cases of a test string.